(12) United States Patent
Popov et al.

(10) Patent No.: US 10,224,778 B2
(45) Date of Patent: Mar. 5, 2019

(54) ELECTRIC MOTOR VEHICLE COOLANT PUMP

(71) Applicant: PIERBURG PUMP TECHNOLOGY GMBH, Neuss (DE)

(72) Inventors: Vladimir Popov, VS-Villingen (DE); Maik Waberski, Neustadt (DE); Ronald Rathke, Doebeln (DE); Jens Teubel, Hartha (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 214 days.

(21) Appl. No.: 15/113,050

(22) PCT Filed: Jan. 14, 2015

(86) PCT No.: PCT/EP2015/050559
§ 371 (c)(1),
(2) Date: Jul. 21, 2016

(87) PCT Pub. No.: WO2015/110326
PCT Pub. Date: Jul. 30, 2015

(65) Prior Publication Data
US 2016/0365768 A1    Dec. 15, 2016

(30) Foreign Application Priority Data
Jan. 23, 2014  (EP) ..................... 14152277

(51) Int. Cl.
*H02K 5/12* (2006.01)
*H02K 5/128* (2006.01)
(Continued)

(52) U.S. Cl.
CPC ............... *H02K 5/128* (2013.01); *F01P 3/20* (2013.01); *F01P 5/12* (2013.01); *F04D 1/00* (2013.01);
(Continued)

(58) Field of Classification Search
CPC ..... H02K 5/128; H02K 9/22; F01P 2005/125; F01P 3/20; F01P 5/12; F04D 1/00;
(Continued)

(56) References Cited

U.S. PATENT DOCUMENTS

| 4,086,508 A | 4/1978 | Masumoto et al. |
| 4,615,662 A * | 10/1986 | Laing ................ F04D 13/0653 |
| | | 417/420 |

(Continued)

FOREIGN PATENT DOCUMENTS

| CN | 101389258 A | 3/2009 |
| DE | 25 28 808 A1 | 1/1976 |

(Continued)

*Primary Examiner* — Bernard Rojas
*Assistant Examiner* — Rashad H Johnson
(74) *Attorney, Agent, or Firm* — Norman B. Thot

(57) ABSTRACT

An electric motor vehicle coolant pump includes a pump rotor which pumps a coolant and a drive motor which drives the pump rotor. The drive motor includes a dry motor stator comprising motor coils, a wet motor rotor, and a gap tube configured to separate the dry motor stator and the wet motor rotor from each other in a fluid-tight manner. The gap tube is formed by an integral sheet metal body which, in a gap region between the wet motor rotor and the dry motor stator consists of an austenitic high-grade steel comprising a material thickness of <0.5 mm, a hardness of from 200 to 500, a specific electrical resistance >0.10Ω×mm²/m, and a relative magnetic permeability<20. The integral sheet metal body forms a sheet metal shell sliding bearing shell of a sliding bearing to radially mount the wet motor rotor.

12 Claims, 2 Drawing Sheets

US 10,224,778 B2
Page 2

(51) Int. Cl.
| | |
|---|---|
| *F04D 13/06* | (2006.01) |
| *F01P 3/20* | (2006.01) |
| *F01P 5/12* | (2006.01) |
| *F04D 1/00* | (2006.01) |
| *F04D 29/22* | (2006.01) |
| *H02K 9/22* | (2006.01) |

(52) U.S. Cl.
CPC ..... *F04D 13/0626* (2013.01); *F04D 13/0633* (2013.01); *F04D 29/22* (2013.01); *F01P 2005/125* (2013.01); *H02K 9/22* (2013.01); *H02K 2213/03* (2013.01)

(58) Field of Classification Search
CPC ............... F04D 13/025; F04D 13/0626; F04D 13/0633; F04D 29/083; F04D 29/086; F04D 29/22
USPC ..................................................... 310/62, 63
See application file for complete search history.

(56) References Cited

U.S. PATENT DOCUMENTS

| | | | | |
|---|---|---|---|---|
| 5,356,272 A * | 10/1994 | Nagata | ................... | F02M 37/08 417/366 |
| 5,915,931 A * | 6/1999 | Lindner | ............... | H02K 49/106 417/420 |
| 5,924,851 A * | 7/1999 | Obata | ................. | F04D 29/0413 417/365 |
| 6,486,761 B1 * | 11/2002 | Czarnetzki | .............. | B60T 8/363 251/129.15 |
| 6,672,818 B1 * | 1/2004 | Terracol | ................ | F04D 29/043 192/84.1 |
| 2004/0184936 A1 * | 9/2004 | Yanagihara | ........... | F04D 29/026 417/420 |
| 2005/0019182 A1 * | 1/2005 | Klein | .................... | F04D 29/026 417/420 |
| 2006/0057006 A1 | 3/2006 | Williams et al. | | |
| 2010/0288316 A1 | 11/2010 | Ertle et al. | | |
| 2017/0093252 A1 * | 3/2017 | Otsubo | ............... | F04D 13/0606 |
| 2017/0126089 A1 * | 5/2017 | Bao | ..................... | F04D 13/0626 |
| 2017/0302133 A1 * | 10/2017 | Ehrsam | ................ | F04D 29/426 |

FOREIGN PATENT DOCUMENTS

| | | |
|---|---|---|
| DE | 200 07 099 U1 | 9/2000 |
| DE | 10 2010 011 316 A1 | 9/2011 |
| DE | 20 2011 051 526 U1 | 11/2011 |
| DE | 10 2011 079 224 B3 | 12/2012 |
| EP | 0 530 786 A2 | 3/1993 |
| EP | 1 635 065 A1 | 3/2006 |
| JP | 2006-257912 A | 9/2006 |
| JP | 2011-106323 A | 6/2011 |

* cited by examiner

ELECTRIC MOTOR VEHICLE COOLANT PUMP

CROSS REFERENCE TO PRIOR APPLICATIONS

This application is a U.S. National Phase application under 35 U.S.C. § 371 of International Application No. PCT/EP2015/050559, filed on Jan. 14, 2015 and which claims benefit to European Patent Application No. 14152277.1, filed on Jan. 23, 2014. The International Application was published in German on Jul. 30, 2015 as WO 2015/110326 A9 under PCT Article 21(2).

FIELD

The present invention relates to an electric motor vehicle coolant pump with a pump rotor driven by an electric drive motor designed as a so-called gap-tube motor.

BACKGROUND

Mechanically driven motor vehicle coolant pumps are mechanically coupled with the internal combustion engine and are therefore not driven as required. In contrast thereto, an electrically driven coolant pump for a motor vehicle can be driven exactly so as to meet demands and, in particular, to convey coolant while the motor vehicle is in operation but while the internal combustion engine is temporarily deactivated. In order to avoid shaft seals that may always be the source of leakages, the drive motors used for electric coolant pumps are so-called gap-tube drive motors in which a cylindrical gap tube separates the dry motor stator formed by the motor coils in a fluid-tight manner from the wet motor rotor arranged in the cooling medium. Gap tubes of plastic material are used in practice almost exclusively because they can be manufactured at low cost and have neutral magnetic properties.

It has, however, been found that in practice diffusion of water or water vapor through a plastics gap tube cannot be entirely avoided unless substantial efforts are taken. By taking suitable measures, for example, encapsulation, it is possible to sufficiently protect the motor coils against humidity diffusing through the gap tube, but, depending on the respective structure, humidity cannot be prevented from reaching the motor electronics consisting of the commutation elements and power semiconductors.

DE 20 2011 051 526 U1, DE 10 2010 011 316 A1 and DE 200 07 099 U1 therefore describe using non-magnetic sheet metal or high-grade steel for the gap tube. These general suggestions were not, however, carried out in practice since demanding a corrosion-resistant high-grade steel that also has advantageous magnetic and electric properties seemed a paradox. Such a solution could also not be realized at low cost.

SUMMARY

An aspect of the present invention is to provide an electric motor vehicle coolant pump having a low-cost and electrically efficient gap-tube drive motor with absolute fluidic impermeability.

In an embodiment, the present invention provides an electric motor vehicle coolant pump which includes a pump rotor configured to pump a coolant and an electric drive motor configured to drive the pump rotor. The electric drive motor comprises a dry motor stator comprising a plurality of motor coils, a wet motor rotor, and a gap tube configured to separate the dry motor stator and the wet motor rotor from each other in a fluid-tight manner. The gap tube is formed by an integral sheet metal body which, in a gap region between the wet motor rotor and the dry motor stator consists of an austenitic high-grade steel comprising a material thickness d of <0.5 mm, a hardness HV of from 200 to 500, a specific electrical resistance r>0.10Ω×mm$^2$/m, and a relative magnetic permeability µr<20. The integral sheet metal body is configured to form a sheet metal shell sliding bearing shell of a sliding bearing to radially mount the wet motor rotor.

BRIEF DESCRIPTION OF THE DRAWINGS

The present invention is described in greater detail below on the basis of embodiments and of the drawings in which.

DETAILED DESCRIPTION

Figure 1:
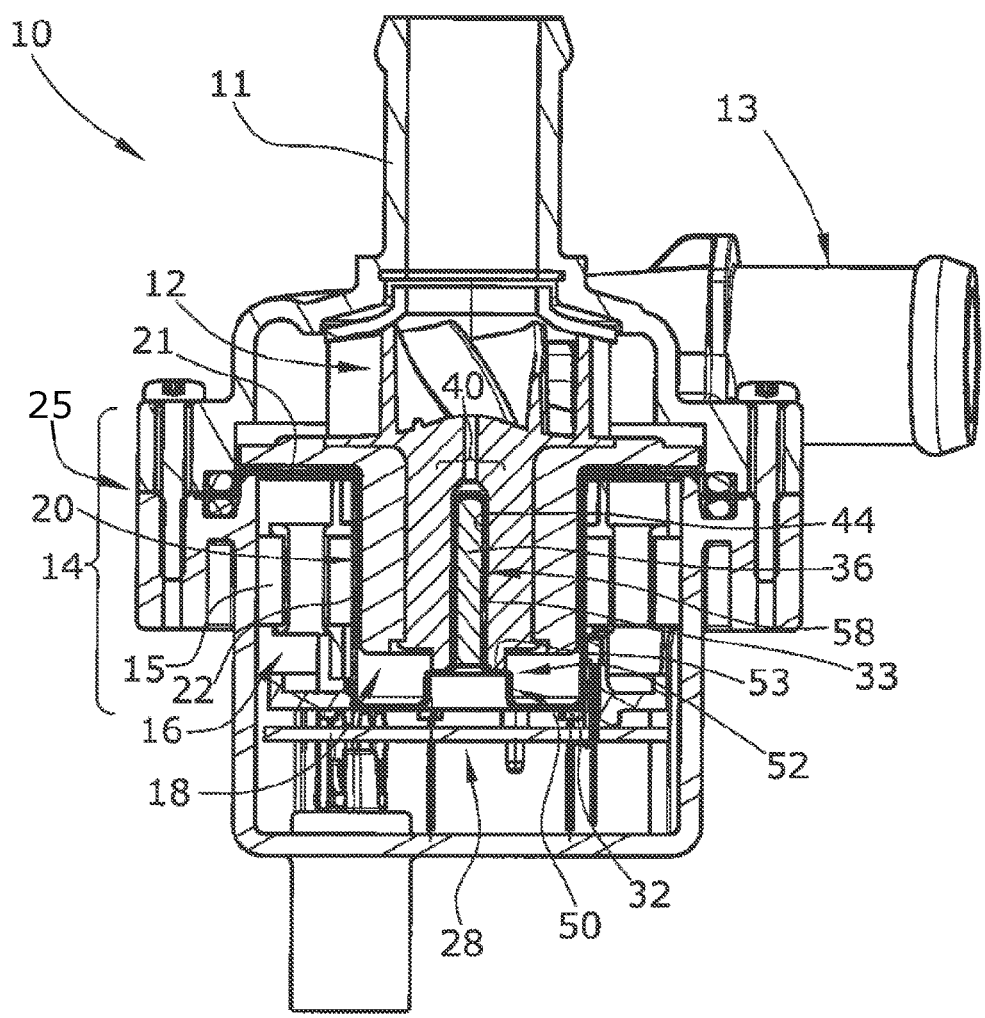
FIG. 1 shows a longitudinal section of an electric motor vehicle coolant pump with a gap-tube drive motor having a gap tube formed from a sheet metal body.
Figure 2:
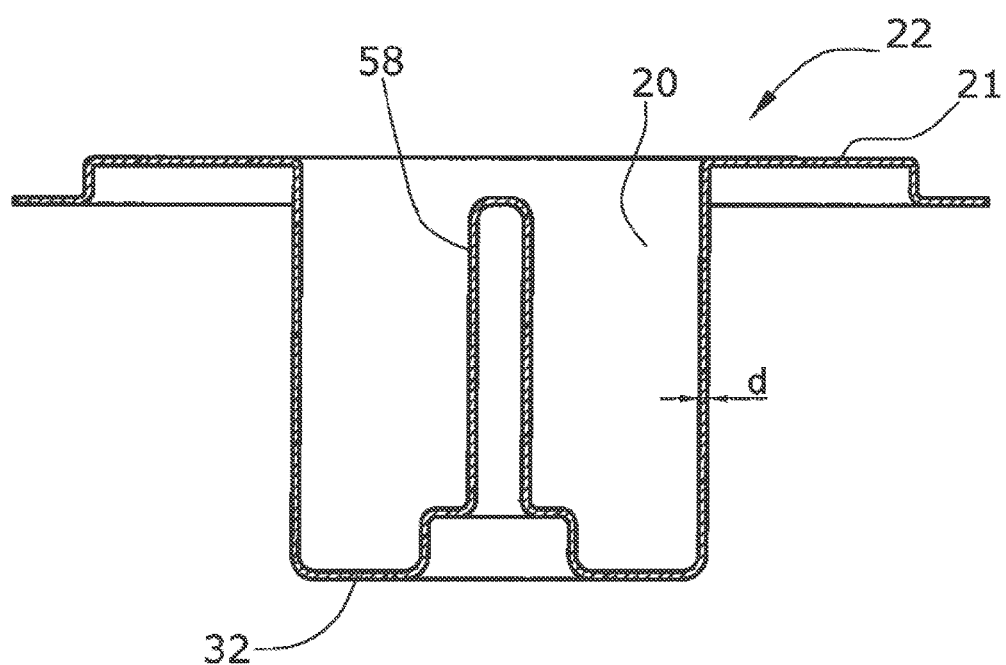
FIG. 2 shows an enlarged longitudinal section of the gap tube of the coolant pump in FIG. 1.

The electric motor vehicle coolant pump of the present invention comprises a pump rotor for pumping the coolant, where the rotor can, for example, be designed as a vane or as a so-called impeller. The pump rotor is driven by an electric drive motor. The electric drive motor has a plurality of motor coils that together form the motor stator arranged in the dry section of the drive motor. The motor rotor is arranged in the wet section and can, for example, be excited in a permanent-magnetic manner. An electronic commutation is provided to control the motor coils. The motor stator and the motor rotor are separated from each other in a fluid-tight manner by a gap tube.

The gap tube is formed by a sheet metal body that has a material thickness d<0.5 in the gap portion between the motor rotor and the motor stator. Due to the use of a metal for the gap tube, absolute impermeability to humidity is provided and the material thickness of the gap tube can be kept low, whereby the lossy gap between the motor rotor and the motor stator can also be kept small. This improves the electric efficiency of the drive motor.

The sheet metal body forming the gap tube is made of austenitic high-grade steel. Austenitic high-grade steel is not ferromagnetic. The relative magnetic permeability µr is less than 20, for example, less than 1.5. The use of austenitic high-grade steel provides that magnetic losses in the gap between the motor rotor and the motor stator are low.

The metal of the sheet metal body further has a specific electric resistance p greater than 0.10Ω×mm$^2$/m. The eddy current losses induced in the metal gap tube by the rotating motor rotor are thereby kept low.

The hardness HV of the gap-tube sheet metal body is between 200 and 500. The sheet metal body is sufficiently soft and malleable to be given the desired complex shape by cold working. This is the reason why a relatively low-cost manufacture of a precious metal gap tube is possible at all. The material costs and the shaping costs are, however, relatively high compared to a plastics gap tube.

It is therefore provided that the integral sheet metal body further forms a sliding bearing shell of a sliding bearing to radially mount the motor rotor. Due to the choice of material, the integral sheet metal body may both form the gap tube and a sliding bearing shell of the motor rotor sliding bearing. The higher costs compared to a plastics gap tube are thereby in part compensated.

In an embodiment of the present invention, both the gap tube and the sliding bearing shell can, for example, be made from the sheet metal body in a single deep-drawing process.

In an embodiment of the present invention, the roughness Rz of the sheet metal body in the region of the sliding bearing shell can, for example, be less than 3.6 µm. The sliding bearing shell must have a relatively high degree of smoothness in order to also provide a long-term low bearing friction. The low bearing friction provides no or only little material abrasion and low heat generation. The corresponding sliding bearing shell of the motor rotor can, for example, be made of carbon. The material pairing of the sliding bearing, consisting of austenitic high-grade steel with a low roughness and carbon, provides a self-lubricating sliding bearing having low friction and high durability.

In an embodiment of the present invention, the pot-shaped sheet metal body can, for example, have an annular step at the center of the pot bottom located on a transversal plane, the annular step being, for example, designed as an axial bearing ring of an axial sliding bearing. Due to the additional annular step that makes the pot bottom bulge axially towards the motor rotor, the stability of the radial sliding bearing shell formed by the sheet metal body is drastically improved with respect to tilting moments. The annular disc of the annular step, arranged on the transversal plane, may also be used to form one side of a single-sided axial bearing for the motor rotor.

In an embodiment of the present invention, the drive motor can, for example, be designed as an internal rotor so that the motor stator is arranged radially outside the motor rotor. The radial sliding bearing shell of the sheet metal body can, for example, have a hollow cylindrical shape, with the hollow cylinder being filled with a cylindrical heat conductor element that can, for example, be metallic, for example, being made of copper. Friction heat of the radial sliding bearing can only poorly be distributed or dissipated due to the thin-walled sheet metal body in the region of the radial sliding bearing shell. By inserting a heat conductor element that, along the entire circumference and the entire length, is in direct contact with the inner wall of the sheet metal body forming the sliding bearing shell, a heat buffer is created in the sliding bearing, and the material cross section useful for heat dissipation is drastically increased, so that also the cooling of the sliding bearing is thereby improved. Due to the improved cooling of the sliding bearing, the strongly temperature-dependent bearing abrasion is reduced so that it is possible to cut back on the bearing quality.

A detailed explanation of an embodiment of the present invention is shown in the drawings and is explained below.

FIG. 1 shows an electric motor vehicle coolant pump 10 in longitudinal section, the coolant pump 10 having an axial coolant inlet 11 and a tangential coolant outlet 13. The coolant pump 10 serves to pump a liquid coolant, for example, water, in a cooling or heating circuit that may be a main circuit or an auxiliary circuit.

The coolant pump 10 has a pump rotor 12 which, in the present case, is in the form of a vane or a so-called impeller. The pump rotor 12 is driven by an electric drive motor 14 which is electronically commutated and controlled by an electronic motor control 28. The electric drive motor 14 is designed as a brushless gap-tube inner rotor so that an annular motor stator 16 is arranged coaxially around a motor rotor 18. The motor rotor 18 is formed by a plurality of motor coils 15. The motor rotor 18, which can be excited in a permanent-magnetic manner, is connected for rotation with the pump rotor 12, wherein an overload clutch may be provided between the motor rotor 18 and the pump rotor 12, which pump may disengage upon a blocking of the pump rotor 12.

The motor stator 16 is arranged in a dry chamber, whereas the motor rotor 18 is arranged in a wet chamber filled with the liquid coolant. The wet chamber and the dry chamber are separated from each other by a rotation-symmetric sheet metal body 22 which, among other elements, forms a cylindrical gap tube 20 in the annular gap between the motor stator 16 and the motor rotor 18. The sheet metal body 22 has a material thickness d=0.3 mm in the region of the cylindrical gap tube 20.

The sheet metal body 22 is made of austenitic high-grade steel 1.4303 (X4CrNi18-12). The sheet metal body 22 approximately has a relative magnetic permeability $\mu_r$=1.0, a hardness HV=300, and a specific electric resistance $\rho$=0.73$\Omega \times$mm$^2$/m.

The sheet metal body 22 has a complex spatial form realized by deep drawing and has a plurality of functions. The sheet metal body 22 serves to shield the dry chamber from the liquid chamber in a gas- and fluid-tight manner. The sheet metal body 22 also forms one side of a motor rotor radial sliding bearing 40. For this purpose, the sheet metal body 22 has a pot shape and is formed with a hollow cylindrical bearing pin 58 at the center of the annular pot bottom 32, the cylindrical outer surface of the pin forming an inner sliding bearing shell 33 of the motor rotor radial sliding bearing 40 for radially mounting the motor rotor 18, and having a roughness Rz of less than 3.5 µm. The outer sliding bearing shell 44 of the motor rotor radial sliding bearing 40 is made of a plastics material, for example, graphite, and is associated with the motor rotor 18 for rotation therewith. The motor rotor radial sliding bearing 40 thus formed is self-lubricating. The bearing pin 58 is entirely filled on its inside by a solid cylindrical heat conductor element 36 of copper. The axial length of the heat conductor element 36 is at least equal to the length of the bearing pin 58 and is seated in the bearing pin 58 with a press fit.

An annular step 50 is provided at the center of the annular pot bottom 32, the bearing pin 58 protruding upward in an axial direction directly from the annular step 50. The annular surface 53 of the annular step 50 axially facing the motor rotor 18 forms a counterface of an axial sliding bearing 52 by which the motor rotor 18 is axially mounted or supported in one direction.

The sheet metal body 22 having a pot shape further comprises an annular disc-shaped annular collar 21 situated in a transversal plane and protruding radially outward from the gap tube 22. The outer circumference of the annular collar 21 is fixed to the coolant pump housing 25 in a liquid-tight manner.

The present invention is not limited to embodiments described herein; reference should be had to the appended claims.

What is claimed is:

1. An electric motor vehicle coolant pump comprising:
   a pump rotor configured to pump a coolant; and
   an electric drive motor configured to drive the pump rotor, the electric drive motor comprising,
   a dry motor stator comprising a plurality of motor coils, a wet motor rotor, and
   a gap tube configured to separate the dry motor stator and the wet motor rotor from each other in a fluid-tight manner, the gap tube being formed by an integral sheet metal body which, in a gap region between the wet motor rotor and the dry motor stator consists of an austenitic high-grade steel comprising:
a material thickness d of <0.5 mm,
a hardness HV of from 200 to 500,
a specific electrical resistance r>0.10Ω×mm$^2$/m, and
a relative magnetic permeability μr<20,
wherein,
the integral sheet metal body is configured to form a sheet metal shell sliding bearing shell of a sliding bearing to radially support the wet motor rotor, and
the sheet metal body sliding bearing shell is configured to have a hollow cylindrical shape.

2. The electrical motor vehicle coolant pump as recited in claim 1, wherein the relative magnetic permeability μr is <1.5.

3. The electrical motor vehicle coolant pump as recited in claim 1, wherein, at least in a region of the sheet metal shell sliding bearing shell, the integral sheet metal body comprises a roughness Rz<3.5 μm.

4. The electrical motor vehicle coolant pump as recited in claim 1, wherein the wet motor rotor comprises a wet motor rotor sliding bearing shell made of carbon.

5. The electrical motor vehicle coolant pump as recited in claim 1, wherein the hollow cylindrical shape of the sheet metal body sliding bearing shell comprises a cylindrical heat conductor element arranged therein.

6. The electrical motor vehicle coolant pump as recited in claim 5, wherein the cylindrical heat conductor element is made of metal.

7. The electrical motor vehicle coolant pump as recited in claim 6, wherein the metal is copper.

8. The electrical motor vehicle coolant pump as recited in claim 1, wherein the integral sheet metal body is deep-drawn.

9. The electrical motor vehicle coolant pump as recited in claim 1, wherein the integral sheet metal body is configured to have,
a pot-shape comprising a pot bottom, and
an annular step arranged in a transverse plane between the sliding bearing and the pot bottom.

10. The electrical motor vehicle coolant pump as recited in claim 9, wherein the annular step is provided as an axial sliding bearing.

11. The electrical motor vehicle coolant pump as recited in claim 1, wherein the electric drive motor is designed as an inner rotor so that the dry motor stator is arranged radially outside the wet motor rotor.

12. An electric motor vehicle coolant pump comprising:
a pump rotor configured to pump a coolant; and
an electric drive motor configured to drive the pump rotor, the electric drive motor comprising,
a dry motor stator comprising a plurality of motor coils,
a wet motor rotor, and
a gap tube configured to separate the dry motor stator and the wet motor rotor from each other in a fluid-tight manner, the gap tube being formed by an integral sheet metal body which, in a gap region between the wet motor rotor and the dry motor stator consists of an austenitic high-grade steel comprising:
a material thickness d of <0.5 mm,
a hardness HV of from 200 to 500,
a specific electrical resistance r>0.10Ω×mm$^2$/m, and
a relative magnetic permeability μr<20,
wherein,
the integral sheet metal body is configured to form a sheet metal shell sliding bearing shell of a sliding bearing to directly radially support the wet motor rotor, and
the sheet metal body sliding bearing shell is configured to have a hollow cylindrical shape.

\* \* \* \* \*